United States Patent
Haimoff et al.

(10) Patent No.: US 9,533,457 B2
(45) Date of Patent: Jan. 3, 2017

(54) SUPPORT PANEL

(71) Applicant: KETER PLASTIC LTD., Herzelyia (IL)

(72) Inventors: Efraim Haimoff, Mevaseret Zion (IL); Nir Apelbaum, Tel Aviv (IL)

(73) Assignee: KETER PLASTIC LTD., Herzelyia (IL)

( * ) Notice: Subject to any disclaimer, the term of this patent is extended or adjusted under 35 U.S.C. 154(b) by 316 days.

(21) Appl. No.: 14/457,457

(22) Filed: Aug. 12, 2014

(65) Prior Publication Data

US 2015/0044429 A1   Feb. 12, 2015

Related U.S. Application Data

(60) Provisional application No. 61/864,726, filed on Aug. 12, 2013.

(51) Int. Cl.
| | |
|---|---|
| *B32B 3/28* | (2006.01) |
| *F16F 1/36* | (2006.01) |
| *F16F 1/373* | (2006.01) |
| *F16F 1/376* | (2006.01) |
| *B29D 28/00* | (2006.01) |
| *A47C 7/02* | (2006.01) |
| *A47C 5/12* | (2006.01) |
| *A47C 7/16* | (2006.01) |
| *B29L 31/44* | (2006.01) |

(52) U.S. Cl.
CPC .............. *B29D 28/00* (2013.01); *A47C 7/027* (2013.01); *A47C 5/12* (2013.01); *A47C 7/16* (2013.01); *B29L 2031/44* (2013.01); *B29L 2031/443* (2013.01); *B32B 3/28* (2013.01); *B32B 2307/51* (2013.01); *F16F 1/36* (2013.01); *F16F 1/373* (2013.01); *F16F 1/376* (2013.01); *Y10S 297/02* (2013.01); *Y10T 428/24083* (2015.01); *Y10T 428/24174* (2015.01); *Y10T 428/24636* (2015.01); *Y10T 428/24645* (2015.01); *Y10T 428/24785* (2015.01)

(58) Field of Classification Search
USPC ................................... 267/144, 145
See application file for complete search history.

(56) References Cited

U.S. PATENT DOCUMENTS

| | | | | |
|---|---|---|---|---|
| 226,082 | A | * 3/1880 | Lemmon | ................... B44C 5/00 428/32 |
| 1,887,310 | A | * 11/1932 | King | ..................... B60N 2/707 248/633 |

(Continued)

FOREIGN PATENT DOCUMENTS

| | | | |
|---|---|---|---|
| EP | 107283 A2 | * 5/1984 | |
| EP | 517614 A1 | * 12/1992 | |
| FR | 557625 A | * 8/1923 | ............... A47C 7/16 |

*Primary Examiner* — Jeff Vonch (74) *Attorney, Agent, or Firm* — Vorys, Sater, Seymour & Pease LLP (57) ABSTRACT

Provided is an injection molded panel having a top side and a bottom side. The panel is configured with at least an elastic portion, the elastic portion including a plurality of undulating deformable strands intersecting with one another at rigid connecting locations, the rigid connecting locations alternatingly extending at opposite sides of the panel at alternating top peaks and bottom peaks, the peaks defining together the respective top side and the bottom side.

11 Claims, 8 Drawing Sheets

(56) References Cited

U.S. PATENT DOCUMENTS

| | | | | |
|---|---|---|---|---|
| 2,094,041 | A * | 9/1937 | Lee | B60N 2/7035 267/144 |
| 2,094,074 | A * | 9/1937 | Lee | B60N 2/7035 119/347 |
| 2,158,929 | A * | 5/1939 | Dunajeff | A47C 7/16 297/452.55 |
| 2,217,893 | A * | 10/1940 | Dunajeff | A47C 7/285 267/103 |
| 2,233,592 | A * | 3/1941 | Dunajeff | B21D 13/02 229/90 |
| 2,276,608 | A * | 3/1942 | Bugge | B29C 43/18 139/420 R |
| 2,393,349 | A * | 1/1946 | Weingarten | A47C 7/285 267/144 |
| 2,627,644 | A * | 2/1953 | Foster | D03D 9/00 156/84 |
| 2,677,872 | A * | 5/1954 | Teague | D03D 15/08 139/421 |
| 3,012,256 | A * | 12/1961 | Zerbee | A47C 7/24 297/452.43 |
| 3,197,357 | A * | 7/1965 | Schulpen | B26D 3/281 264/160 |
| 3,233,885 | A * | 2/1966 | Propst | A47B 96/202 267/153 |
| 3,419,456 | A * | 12/1968 | Tenney | B29C 33/00 156/242 |
| 3,767,261 | A * | 10/1973 | Rowland | A47C 5/04 297/239 |
| 4,168,340 | A * | 9/1979 | Buyssens | D03D 1/00 428/295.7 |
| 4,731,281 | A * | 3/1988 | Fleischer | B01D 39/083 139/383 A |
| 5,632,526 | A * | 5/1997 | McLarty, III | D03D 15/00 297/284.1 |
| 5,747,140 | A * | 5/1998 | Heerklotz | A47C 27/144 248/630 |
| 6,207,256 | B1 * | 3/2001 | Tashiro | B32B 3/12 428/116 |
| 6,284,346 | B1 * | 9/2001 | Sheridan | B32B 3/28 428/131 |
| 6,644,535 | B2 * | 11/2003 | Wallach | B21F 27/128 219/153 |
| 6,726,285 | B2 | 4/2004 | Caruso et al. | |
| 7,172,982 | B2 * | 2/2007 | Jaglowski | B31F 1/2881 139/383 A |
| 7,455,365 | B2 * | 11/2008 | Caruso | A47C 1/03 297/452.15 |
| 7,472,962 | B2 | 1/2009 | Caruso et al. | |
| 7,794,022 | B2 | 9/2010 | Caruso et al. | |
| 8,070,903 | B1 * | 12/2011 | Meschter | B29C 43/22 156/242 |
| 8,615,956 | B2 * | 12/2013 | Valente | B32B 3/266 52/633 |
| 2001/0007177 | A1 * | 7/2001 | Brown, Jr. | A43B 13/026 36/27 |
| 2004/0154252 | A1 * | 8/2004 | Sypeck | B29D 24/00 52/506.01 |
| 2005/0057085 | A1 | 3/2005 | Wu | |
| 2009/0133195 | A1 | 5/2009 | Elzenbeck | |
| 2011/0129623 | A1 | 6/2011 | Haimoff | |
| 2012/0149263 | A1 * | 6/2012 | Cvek | D03D 15/08 442/2 |
| 2013/0096887 | A1 * | 4/2013 | Fee | G06F 17/5009 703/1 |
| 2013/0139329 | A1 | 6/2013 | Ferniani et al. | |

* cited by examiner

Fig. 7C

SUPPORT PANEL

TECHNOLOGICAL FIELD

The present disclosed subject matter is concerned with a plastic molded support panel.

BACKGROUND ART

References considered to be relevant as background to the presently disclosed subject matter are listed below:
U.S. Pat. No. 6,726,285
U.S. Pat. No. 7,455,365
U.S. Pat. No. 7,472,962
U.S. Pat. No. 7,794,022

Acknowledgement of the above references herein is not to be inferred as meaning that these are in any way relevant to the patentability of the presently disclosed subject matter.

BACKGROUND

Acknowledgement of importance of the "comfort" provided by seating and resting surfaces has resulted in the design of seats comprising means allowing the adaptation of such seats to the profile of the sited person. Flexible and/or deformable support panels intended to provide comfort are known in the art. Such panels are typically used for seating or resting surfaces such as chair seats or backrests and provide a degree of flexibility and contouring the occupying body. These panel structures are intended to enhance the user's comfort and further provide for an ergonomic seating or resting surface.

Example of such support panels is disclosed e.g. in U.S. Pat. No. 7,794,022 directed to a body support structure which includes a support frame having at least first and second opposite side portions and defining an opening therebetween. A molded elastomeric member is connected to the first and second side portions and suspended over the opening. The molded elastomeric member includes a mechanical structure decoupling the molded elastomeric member in first and second directions such that the molded elastomeric member has different load bearing characteristics in the first and second directions, wherein the first direction is different than the second direction. A method for forming a load bearing structure is also provided.

GENERAL DESCRIPTION

The present disclosure calls for an injection molded panel configured with at least an elastic portion, said elastic portion comprising a plurality of undulating deformable strands intersecting with one another at rigid connecting locations, said rigid connecting locations alternatingly extending at opposite sides of the pane.

The arrangement is such that applying force over the connecting locations, i.e. a force having a vector component extending in a direction normal to the connecting locations, results in deformation of the deformable strands in a direction so as to increase the angle between the strands extending from a common connecting location facing the direction of the applied force, namely increasing the angle between the strands and said vector component. In accordance with this embodiment, deformation of the strand portions extending between said rigid connecting locations is such that upon applying force over a surface of the panel, a normal distance between top connecting locations and the neighboring bottom connecting locations decreases, i.e. they are brought closer one towards the other by increase in the angle between the strands extending from the connecting locations. With the increase of angle the panel elastically deforms and returns to its initial configuration upon the elimination of the applied force.

The elastic portion can be configured with a plurality of connecting locations each configured of any practical number of strands extending therefrom.

A plastic injection molded panel configured with a top side and a bottom side, defined by a plurality of alternatingly extending rigid connecting locations, wherein neighboring connecting locations are interconnect by undulating deformable strands.

According to a particular example, the disclosed subject matter is directed to an injection molded panel comprising at least a portion configured with a plurality of undulating warp strands and a plurality of undulating weft strands interlacing said warp strands, wherein the warp strands and weft strands alternatingly intersect at a top side of the panel and at a bottom side of the panel, and whereby at locations of intersection of the warp strands and weft strands they form together an integrated, rigid connecting location, and wherein interconnecting warp strand portions and weft strands portions extending between said connecting location are deformable.

Locations of intersection of the warp strands and weft strands extend at alternating top peaks and bottom peaks, said peaks defining together the respective top side and the bottom side.

According to another aspect of the present disclosed subject matter there is a frame configured with an injection molded panel comprising at least a portion configured with a plurality of undulating warp strands and a plurality of undulating weft strands interlacing said warp strands, wherein the warp strands and weft strands alternatingly intersect at a top side of the panel and at a bottom side of the panel, and whereby at locations of intersection of the warp strands and weft strands they form together an integrated, rigid connecting location, and wherein interconnecting warp strand portions and weft strands portions extending between said connecting location are deformable.

The panel can be integrally molded with the frame or it can be articulated thereto.

The frame can be coplanar with at least one of the top side and the bottom side of the panel.

According to yet an aspect of the present disclosed subject matter there is a furniture article comprising at least a portion configured with an injection molded panel comprising at least a portion configured with a plurality of undulating warp strands and a plurality of undulating weft strands interlacing said warp strands, wherein the warp strands and weft strands alternatingly intersect at a top side of the panel and at a bottom side of the panel, and whereby at locations of intersection of the warp strands and weft strands they form together an integrated, rigid connecting location, and wherein interconnecting warp strand portions and weft strands portions extending between said connecting location are deformable.

The panel portion of the furniture article can constitute for example a seat portion of a chair, a back rest portion of a chair, a support portion of a bed, or of an arm chair, etc.

Any one or more of the following features, designs and configurations can be incorporated in the panel according to the disclosed subject mater, in combinations or independently:

Elastic deformation of the interconnecting warp strands portions and weft strands portions extending between said connecting location is in a plane of the undulation of the warp strands portions and weft strands portions, i.e. parallel to the vector force applied; upon applying force over a surface of the panel, a normal distance i.e. between top connecting locations and the neighboring bottom connecting locations decreases;

The panel is made of a non-creeping material, such that upon seizing of a load applied to the panel it assumes its original shape;

The connecting locations are substantially rigid and non-deformable;

The connecting locations are thicker than neighboring interconnecting strands, such as the warp strand portions and weft strands portions. According to a particular configuration, the thickness of the connecting locations is about as thick as the accumulated thickness of respective interconnecting warp strand portions and weft strands portions;

The molded panel can resemble a wickerwork panel. According to a particular example the molded panel can have a rattan-like appearance;

The warp strands and weft strands can intersect at right angles;

The warp strands and weft strands can intersect at an angle;

The panel can be entirely flat or can have flat portions;

The panel can be shaped in conformity with agronomic parameters such as to form a seat portion or a lumber and/or shoulder of a back rest, deformed from the panel side;

Elasticity parameters of the panel can be controlled by manipulating one or more features of the panel. For example, the panel can be configured with uneven undulating patterns (e.g. altering adulating amplitude), non-uniform thickness of the interconnecting warp strand portions and weft strands portions extending between the connecting locations, non-uniform width of interconnecting warp strand portions and weft strands portions extending between said connecting locations;

Elasticity parameters can be controlled by using multi-component injection, whereby different portions of the panel can be molded of different material compositions altering their elasticity;

Elasticity parameters of the panel can be uniform over the entire panel or be different at one or more portions thereof. The elasticity parameters can be uniform in directional sense, or non-uniform. For example, the panel can be more elastic in reaction to force components applied in one direction than to force components applied in another direction;

The support panel can be articulated with a furniture item or an addition thereto or a stand-alone panel for use in conjunction with supporting surfaces. For example the support panel can serve as a support panel cushioning over a seat (chair, armchair, swing, wheelchair, bed, sofa, and the like);

At least some of the top peaks and the bottom peaks can be smoothed/rounded for convenience.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
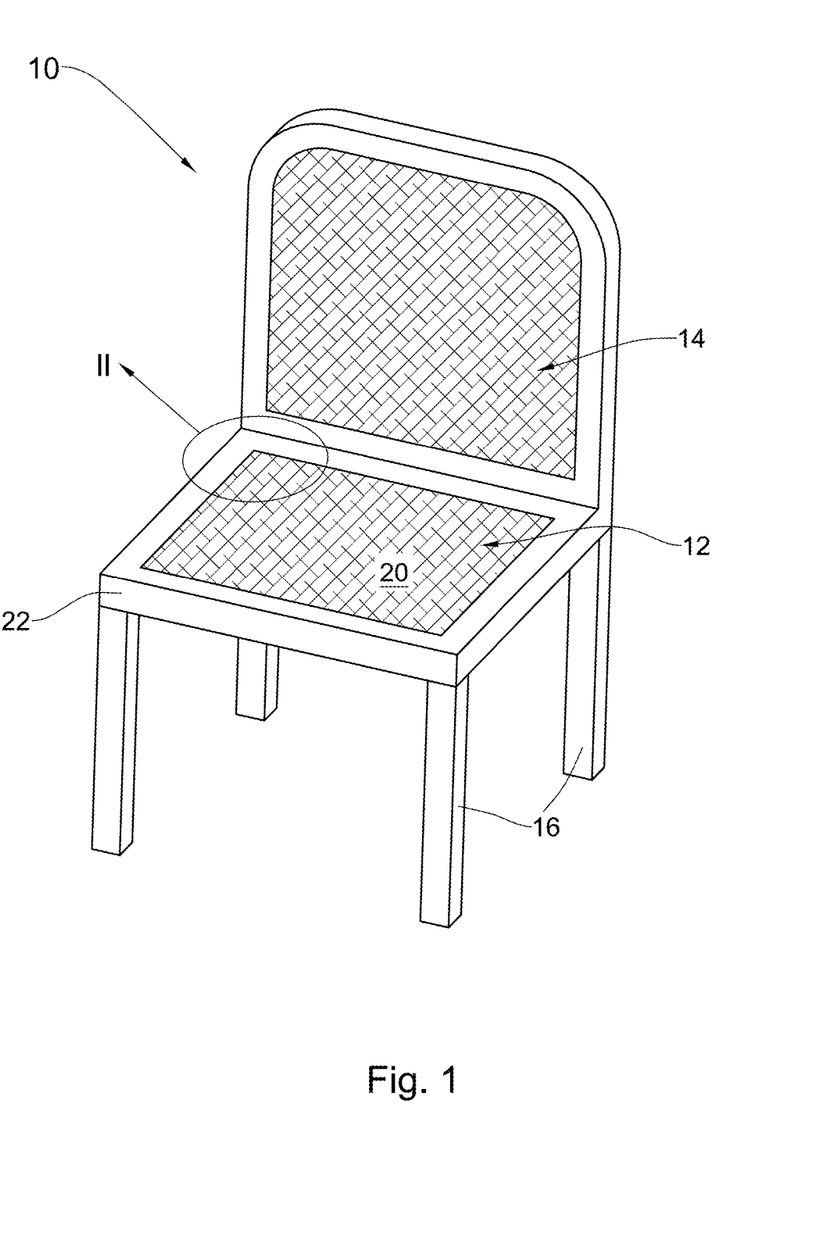
FIG. 1 is an example of a classic bistro chair comprising a support panel according to the present disclosed subject meter.

In FIG. 1 of the drawings there is illustrated a bistro-type chair generally designated 10 configured with a seat portion 12 and a back rest 14.

The chair 10 is a mere example of a furniture item configured with a support panel according to the present disclosure, and it is appreciated that such a support panel can be applied to a variety of furniture items, integrated therewith or detachably attachable thereto. Furthermore, it is to be noted that a support panel with which the disclosure is concerned can be a so-called 'stand-alone' item, i.e. configured for applying over different structured such as, for example, a wheelchair seat, a therapeutic bed, a beach bed and the like.

Likewise, the support panel 12 illustrated hereinafter in greater detail, is a particular example of a support panel according to the present disclosure, and however it is appreciated that by no means the disclosure is to be restricted thereto.

Figure 2:
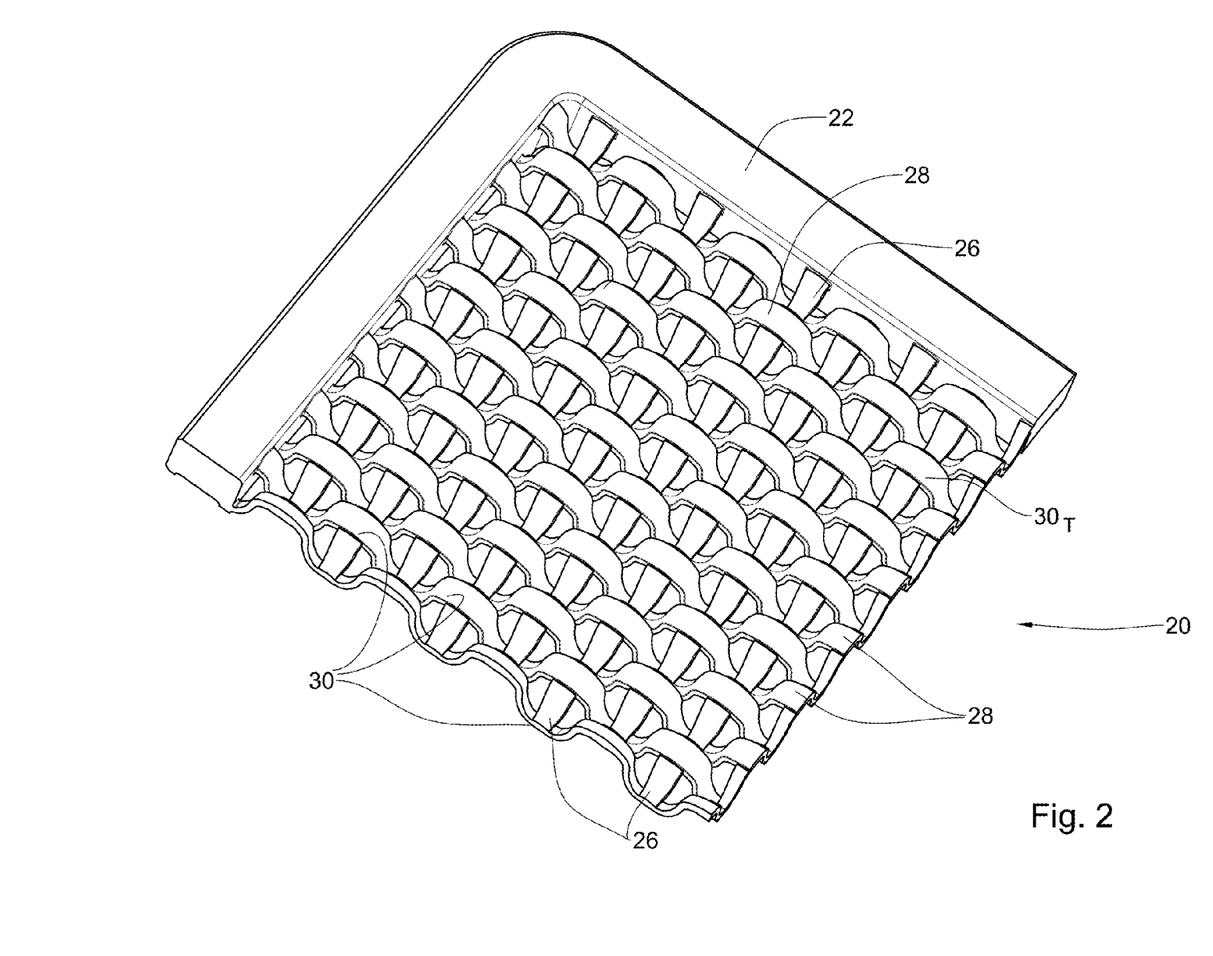
FIG. 2 is a perspective view of a portion marked II of a support seat of the chair of FIG. 1.
Figure 3A:
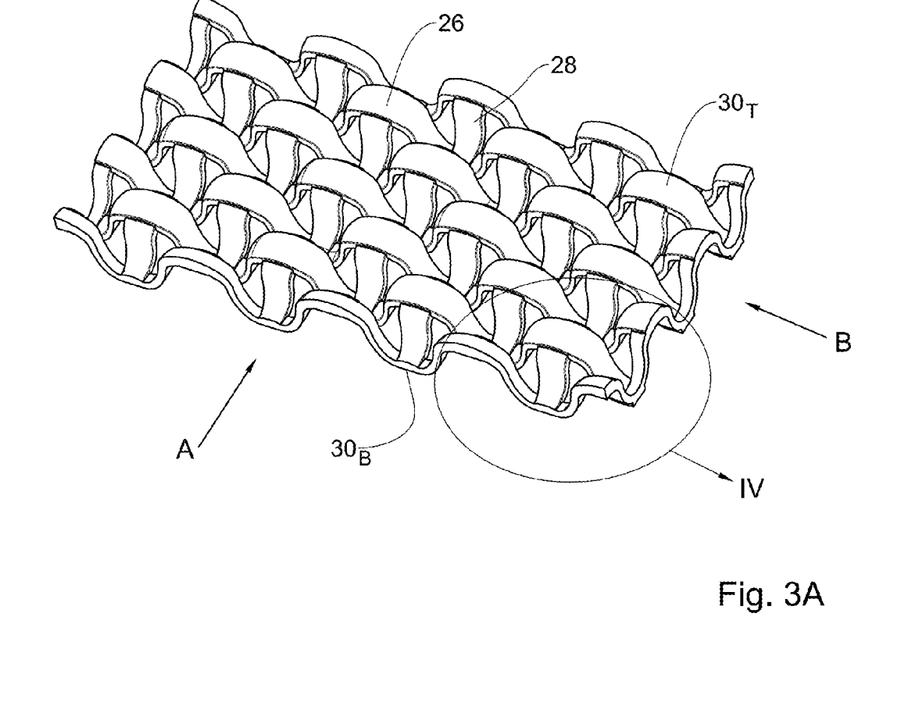
FIG. 3A is a top perspective view of a portion of the support panel of FIG. 2.
Figure 3B:
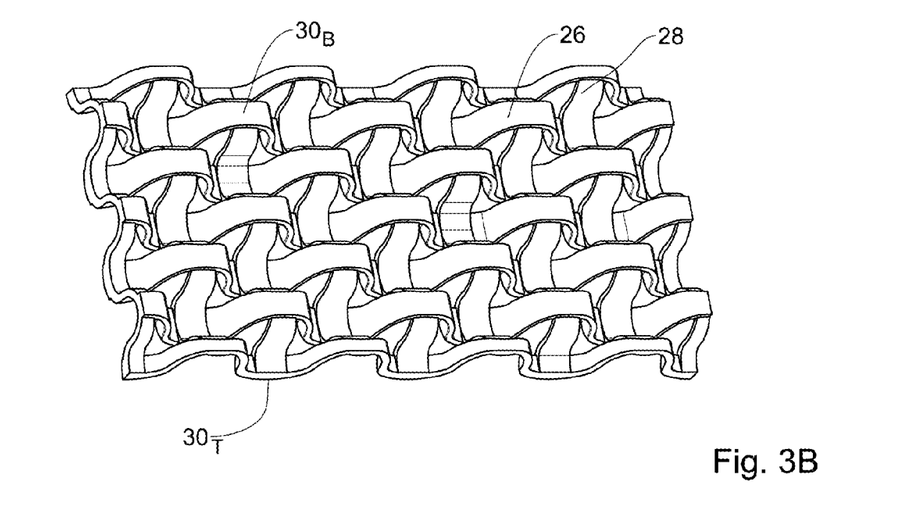
FIG. 3B is a bottom view of FIG. 3A.

In the particular example, the seat portion 12 comprises a support panel portion 20 and a peripheral frame 22 fixedly mounted over the four chair legs 16. Frame 22, as already mentioned, can be integrated with the support panel portion 20 or detachably articulated thereto, however in a sturdy manner.

As can be seen, best in the following drawings, the support panel 20 configured as an elastic portion manufactured by injection molding, said elastic portion comprising a plurality of undulating, deformable warp strands 26 and woof strands 28, intersecting with one another at rigid connecting locations 30, said rigid connecting locations 30 alternatingly extending at opposite top side 32 and bottom side 34 of the support panel 20, wherein for sake of clarity top connecting locations are designated as $30_T$ and bottom connecting locations are designated $30_B$, respectively (e.g. FIGS. 5 and 6). Locations of intersection of the warp strands and weft strands extend at alternating top peaks $30_T$ and bottom peaks $30_B$, defining together the respective top face 32 and the bottom face 34 of the support panel 20.

The plurality of alternatingly extending rigid connecting locations 30 are thus interconnected with neighboring connecting locations 30 by the undulating deformable warp strands 26 and weft strands 28, so as to impart the support panel 20 with resilience, as will become apparent hereinafter. The connecting locations 30 are substantially rigid and non-deformable.

Figure 4:
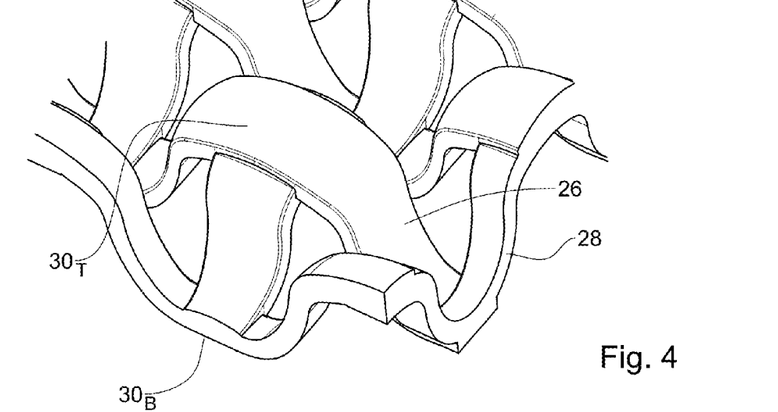
FIG. 4 is an enlargement of the portion marked IV in FIG. 3A.

The arrangement is such that at locations of intersection of the warp strands 26 and weft strands 28, i.e. at the connecting locations 30, they form together an integrated, rigid and substantially solid connecting location, whilst the interconnecting warp strand portions 26 and weft strands portions 28, extending between neighboring connecting locations 30 are deformable, that is flexible however to an extent so as to assume shape of the panel 20. According to one particular arrangement the warp and weft strand portions are resilient (elastic, pliant) as compared with the respective connecting locations 30 owing to their thickness being lesser than that of the connecting locations 30 (best seen in FIG. 4). According to a particular configuration, the thickness of the connecting locations 30 is about as thick as the accumulated thickness of respective interconnecting warp strand portions 26 and weft strands portions 28. Also, the geometry (i.e. shape and cross-section) of the warp and weft strand portions can alter along their length and width, so as to impart the strands with the required resilience. It is also appreciated that different zones of the panel may be imparted with different resiliency, depending on the intended use thereof.

It is further appreciated that whilst in the exemplified drawings the support panel 20 is of uniform thickness, according to other forms (not shown) the thickness as well as pattern of the interconnecting warp strand portions 26 and weft strands portions 28 may differ over the panel. Likewise, whilst in the illustrations the arrangement is a classic warp and weft like pattern, i.e. two warp strand portions 26 and two weft strands portions 28 extending from a respective connecting location 30, other configurations are possible too, with more or less strand portions extending from a respective connecting location (not shown).

Figure 5A:
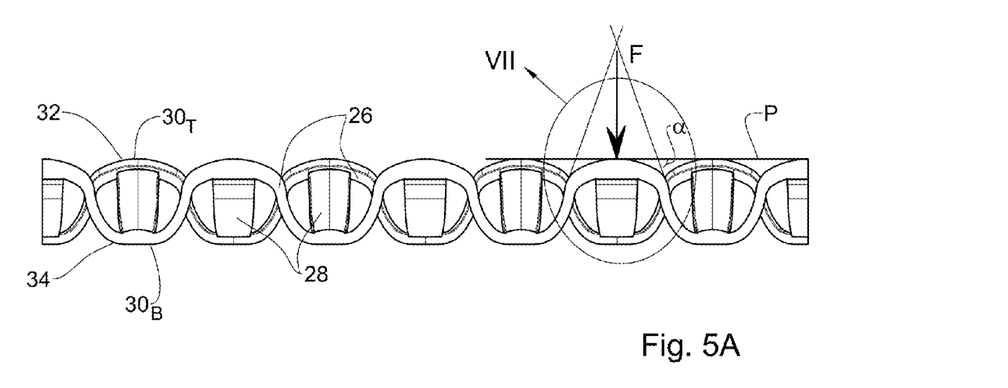
FIG. 5A is a side view taken from direction of arrow A in FIG. 3A.
Figure 5B:
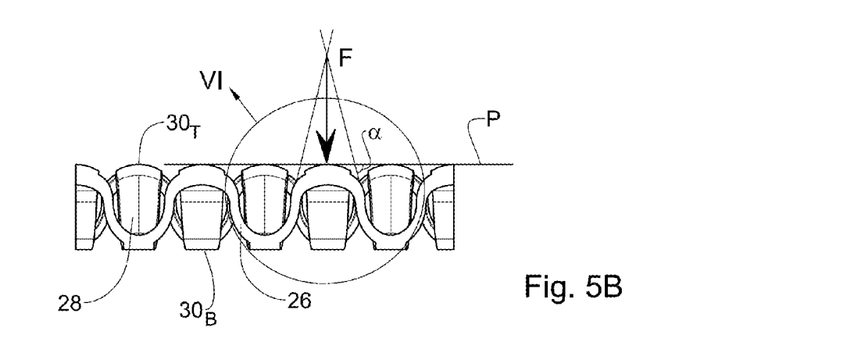
FIG. 5B is a side view taken from direction of arrow B in FIG. 3A.
Figure 6A:
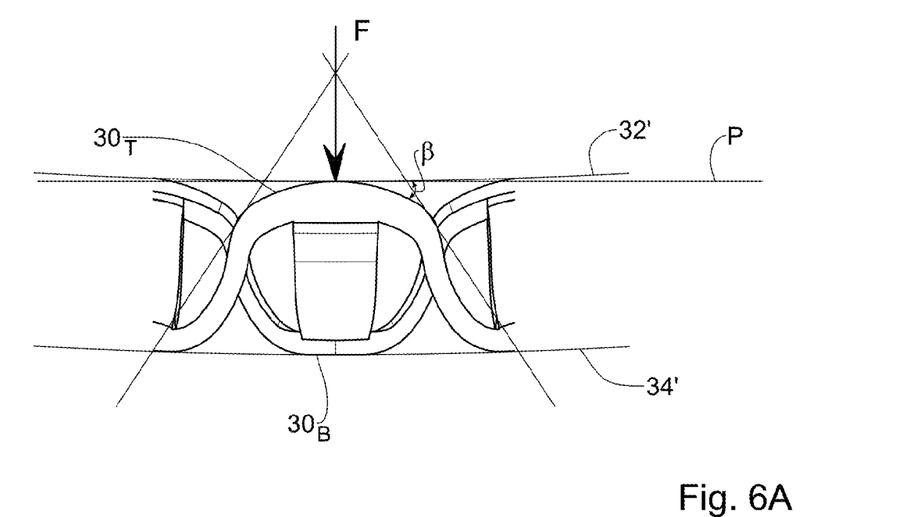
FIG. 6A is an enlarged view of the portion marked VII of FIG. 5A, however in a deformed configuration, upon applying force on the support panel.
Figure 6B:
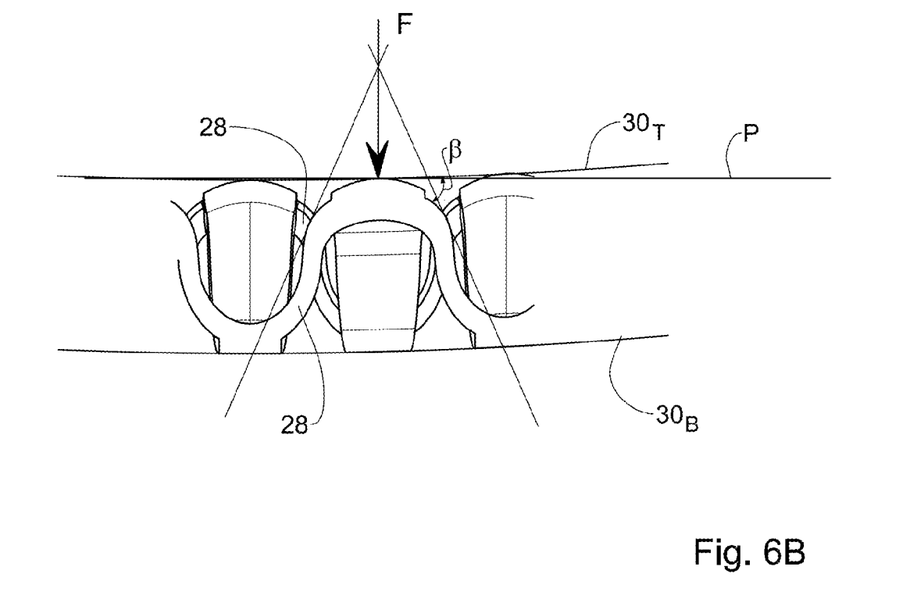
FIG. 6B illustrates a portion marked VI of FIG. 5B, however upon applying force on the support panel.
Figure 7A:
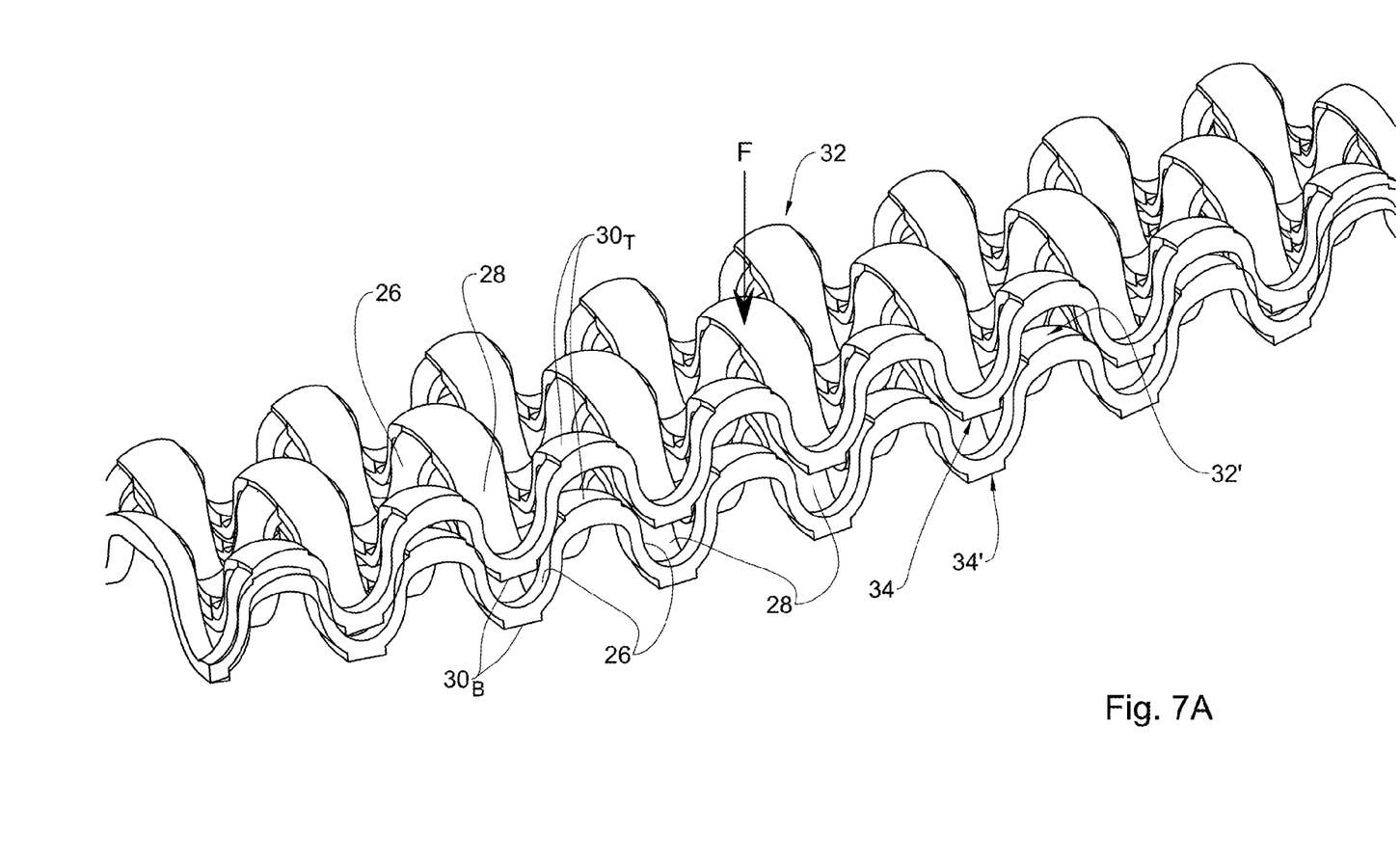
FIG. 7A is a top perspective view of a portion of FIG. 5A, however upon applying force on the support panel, where a deformed and a non deformed layers are superimposed.
Figure 7B:
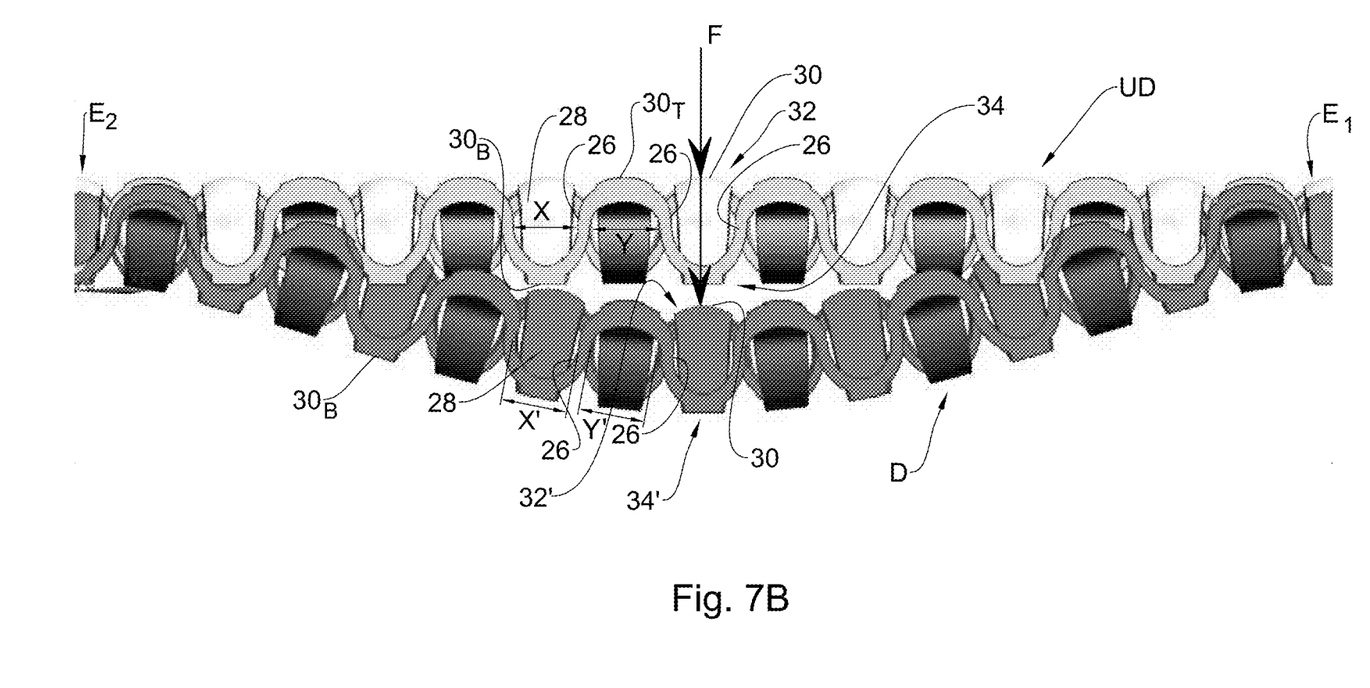
FIG. 7B is a side view of FIG. 7A.

With further reference being made in particular to FIGS. 5 to 7, the mechanics of the system is demonstrated, wherein the arrangement is such that applying force F over the connecting locations 30, i.e. a force having a vector component extending in a direction normal to the connecting locations 30 (e.g. as a result of a person sitting on the chair 10) extending along plane P, results in deformation of the deformable warp strand portions 26 and weft strands portions 28, in a direction so as to increase the angle between the strands extending from a common connecting location 30, namely increasing the angle between the strands and said vector component wherein $\alpha > \beta$ (this is best seen in FIGS. 5A and 5B showing the $\alpha$ angle and FIGS. 6A and 6A showing the $\beta$ angle). Simultaneously, as the warp strand portions 26 and weft strands portions 28 deform, the panel deforms so that top surface 32' and bottom surface 34' are now parallely deformed (seen in FIGS. 6A and 6B as well as in FIGS. 7A and 7B). The distance between the connection location 30 at the top peak and the adjacent connection location 30 bottom peak decreases. Once the force F ceases the panel will reassume its original shape. The panel 20 is made of a non-creeping plastic material, such that upon seizing of a load/force F applied to the panel 20 it assumes its original shape. It is noted that in FIGS. 7A and 7B there is illustrated superimposed a deformed layer D and a non-deformed layer UD, for sake of comparison and clarity only.

Figure 7C:
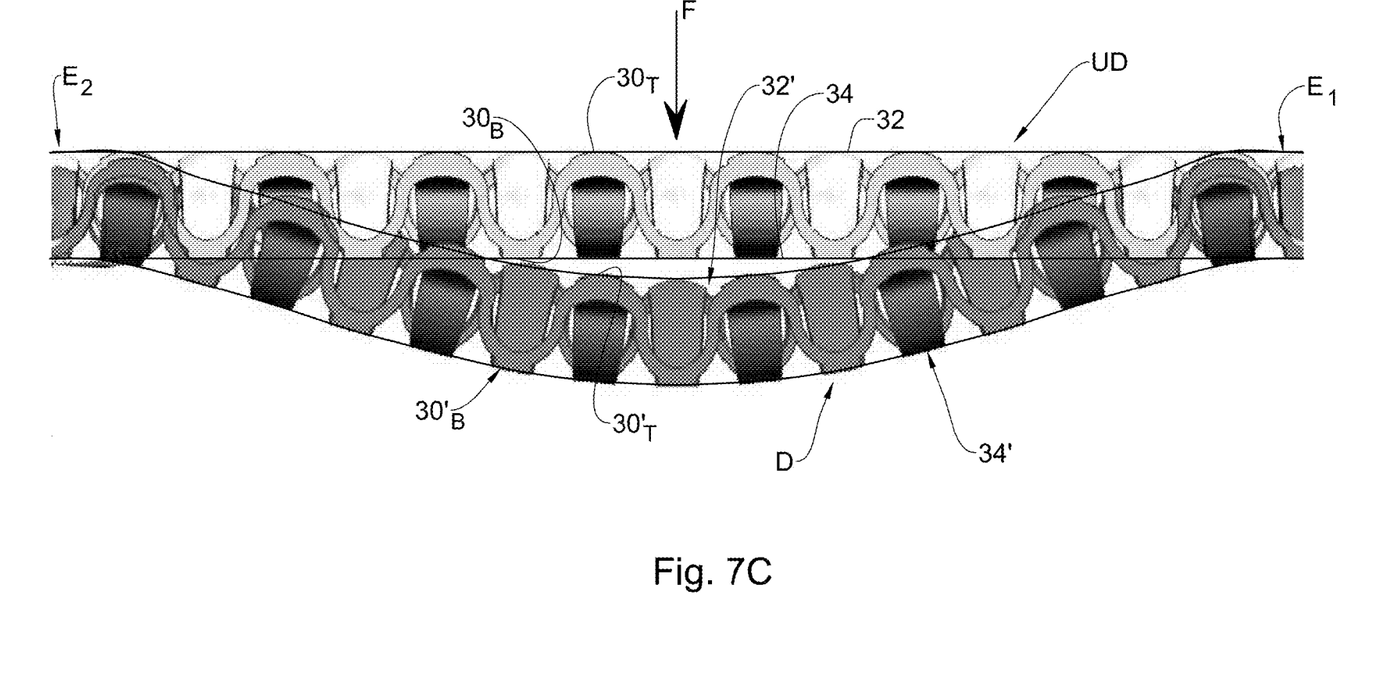
FIG. 7C is similar to FIG. 7B, provided with contour lines for the top and bottom surface plane of the panel.

FIGS. 7A and 7B illustrate the deformation of the panel portion under the force F applied in an axial direction, perpendicular to the surface 32 of the panel portion. As seen in these illustrations and best seen in FIG. 7C, the non-deformed panel layer UD is superimposed over the deformed layer D such that the edges $E_1$ and $E_2$ of the unaffected by the load portions of the panel coextend for the deformed and the undeformed panels, thus clearly illustrating the degree of bending of the panel under the applied load. It is further best seen in FIGS. 7B and 7C the degree of tensioning and the compression of the bottom 34 and top 32 surfaces, respectively, with the deformed surfaces identified by the same numerals with added "'". i.e. 32' and 34'. It is further seen that upon deformation the distance Y between the warp and weft strands 26, 28 extending from the top connection location $30_T$ is expanded to Y' seen in the D layer, thus facilitating the tensioning of the bottom surface 34'. The compression of the top surface 32' is facilitated by the shortening of the distance X extending between the warp and weft strands extending from the bottom connection locations $30_B$ to X' seen in layer D. FIG. 7C illustrates the deformation of the panel by contouring the top and bottom surfaces is a cross section taken in the side view of the panel. It is clearly seen that Y'>Y and X'<X.

The presently disclosed support panel is plastic molded and thus a variety of parameters, features and shapes are controllable, imparting it different appearances and advantages. For example the support panel can resemble a wickerwork panel. According to a particular example the molded panel can have a rattan-like appearance. The strands can intersect at right angles or at an angle. More so, the panel can be entirely flat or can have flat portions or shaped in conformity with agronomic parameters such as to form a seat portion or a lumber and/or shoulder of a back rest, deformed from the panel side, etc.

As already mentioned above, elasticity parameters of the panel can be controlled by manipulating one or more features of the panel. For example, the panel can be configured with uneven undulating patterns (e.g. altering adulating amplitude), non-uniform thickness of the interconnecting warp strand portions and weft strands portions extending between the connecting locations, non-uniform width of interconnecting warp strand portions and weft strands portions extending between said connecting locations. Elasticity parameters can be controlled by using multi-component injection, whereby different portions of the panel can be molded of different material compositions altering their elasticity. Elasticity parameters of the panel can be uniform over the entire panel or be different at one or more portions thereof. The elasticity parameters can be uniform in directional sense, or non-uniform. For example, the panel can be more elastic in reaction to force components applied in one direction than to force components applied in another direction.

The invention claimed is:

1. A plastic injection molded panel having a top side and a bottom side comprising at least an elastic portion, said elastic portion comprising a plurality of undulating weft stands in a first direction and a plurality of undulating warp strands in a second direction, wherein the second direction is at an angle to the first direction interlacing said warp strands, wherein the warp strands and weft strands intersect, whereby intersections of the warps strands and the weft strands form molded integrated, rigid connecting locations, said rigid connecting locations alternatingly extending between the top side and bottom side of the panel in both the first direction and the second direction such that a distance is formed between top rigid connecting locations and bottom rigid connecting locations at alternating top peaks and bottom peaks, said top peaks and said bottom peaks defining the respective top side and the bottom side, wherein warp stand portions and weft strand portions extending between said rigid connecting locations are deformable, such that upon receiving an applied load over the top or bottom side of the panel the deformation of the weft and warp strand portions extending between said rigid connecting locations decreases the distance between top side connecting locations and bottom side connecting locations and upon cessation of the applied load the panel at least partially resumes its original shape.

2. The injection molded panel of claim 1, wherein the deformation between said rigid connecting locations is parallel to the applied load.

3. The injection molded panel of claim 1, wherein the panel comprises a non-creeping material such that upon cessation of the applied load it resumes its original shape.

4. The injection molded panel of claim 1, wherein said connecting locations each comprise two or more stands extending therefrom.

5. The injection molded panel of claim 1, wherein said connecting locations are non-deformable.

6. The injection molded panel of claim 1, wherein the elasticity parameters are controlled by using multi-component injection, whereby different portions of the panel are molded of different material compositions altering their elasticity.

7. The injection molded panel of claim 1, wherein the elasticity parameters of the panel are uniform over the entire panel or different at one or more portions thereof or the elasticity parameters are uniform or non-uniform in a directional sense.

8. The injection molded panel of claim 1, wherein some of said top peaks and said bottom peaks are smoothed/rounded.

9. The injection molded panel of claim 1, wherein the panel comprises a frame portion integrally molded with the panel or articulated thereto.

10. The injection molded panel of claim 1, wherein the panel comprises a frame portion integrally molded with the panel or articulated thereto, and wherein the frame is coplanar with at least one of the top side and the bottom side of the panel.

11. A furniture article comprising an injection molded panel in accordance with claim 1.

* * * * *